United States Patent
Yin et al.

(10) Patent No.: US 10,662,014 B2
(45) Date of Patent: May 26, 2020

(54) IMAGING APPARATUS AND DOUBLE-SIDED PRINTING PAPER CONVEYING UNIT THEREOF

(71) Applicant: Zhuhai Seine Technology CO., Ltd., Zhuhai (CN)

(72) Inventors: Aiguo Yin, Zhuhai (CN); Xining Ding, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 16/021,509

(22) Filed: Jun. 28, 2018

(65) Prior Publication Data

US 2018/0314190 A1 Nov. 1, 2018

Related U.S. Application Data

(63) Continuation of application No. PCT/CN2016/108329, filed on Dec. 2, 2016.

(30) Foreign Application Priority Data

Dec. 29, 2015 (CN) .......................... 2015 1 1006415

(51) Int. Cl.
 *B65H 9/16* (2006.01)
 *G03G 15/00* (2006.01)
 (Continued)

(52) U.S. Cl.
 CPC .............. *B65H 9/166* (2013.01); *B65H 7/00* (2013.01); *B65H 9/16* (2013.01); *B65H 85/00* (2013.01);
 (Continued)

(58) Field of Classification Search
 CPC ..... B65H 85/00; B65H 9/166; G03G 15/6567
 See application file for complete search history.

(56) References Cited

U.S. PATENT DOCUMENTS 4,823,159 A * 4/1989 Yamamoto ............. B65H 9/166
 271/249
7,374,165 B2 * 5/2008 Agata .................... B65H 5/062
 271/248
(Continued)

FOREIGN PATENT DOCUMENTS

CN 1188915 A 7/1998
CN 101152935 A 4/2008
(Continued)

OTHER PUBLICATIONS

The World Intellectual Property Organization (WIPO) International Search Report for PCT/CN2016/108329 dated Feb. 9, 2017 4 Pages.

*Primary Examiner* — Patrick Cicchino
(74) *Attorney, Agent, or Firm* — Anova Law Group, PLLC

(57) ABSTRACT

The present disclosure provides a double-sided printing paper conveying unit, including a paper conveyor configured to convey paper in a conveying direction, a guiding part configured to guide the paper conveyed by the paper conveyor, an aligner movably mounted on the guiding part, and configured to correct a skew posture of the paper during conveyance in an alignment direction perpendicular to the conveying direction; and a movement mechanism mounted on the guiding part and capable of moving the aligner along the alignment direction and between a first position corresponding to a first size of paper and a second position corresponding to a second size of paper such that the aligner aligns the paper based on a size of the paper. In addition, the present disclosure also provides an imaging apparatus that includes the double-sided printing paper conveying unit.

12 Claims, 8 Drawing Sheets

(51) Int. Cl.
  *B65H 85/00*   (2006.01)
  *B65H 7/00*    (2006.01)
  *B65H 9/00*    (2006.01)
  *G03G 15/23*   (2006.01)

(52) U.S. Cl.
  CPC ......... *G03G 15/23* (2013.01); *G03G 15/6567* (2013.01); *B65H 2404/1431* (2013.01); *B65H 2511/10* (2013.01); *B65H 2511/20* (2013.01); *G03G 15/5062* (2013.01)

(56) References Cited

U.S. PATENT DOCUMENTS

| | | | | |
|---|---|---|---|---|
| 8,567,775 | B2* | 10/2013 | Banal | B65H 9/103 |
| | | | | 271/228 |
| 8,684,354 | B2* | 4/2014 | Iino | B65H 1/266 |
| | | | | 271/186 |
| 8,783,440 | B2* | 7/2014 | Yamazaki | B65G 13/02 |
| | | | | 198/457.02 |
| 9,348,291 | B2* | 5/2016 | Yamamoto | G03G 15/6567 |
| 2005/0242493 | A1* | 11/2005 | Agata | B65H 5/062 |
| | | | | 271/226 |
| 2008/0094670 | A1 | 4/2008 | Kim | |
| 2012/0104678 | A1* | 5/2012 | Iino | B41J 3/60 |
| | | | | 271/3.19 |
| 2012/0112406 | A1* | 5/2012 | Matsumoto | B65H 5/023 |
| | | | | 271/234 |

FOREIGN PATENT DOCUMENTS

| | | |
|---|---|---|
| CN | 101738890 A | 6/2010 |
| CN | 102152992 A | 8/2011 |
| CN | 203865725 U | 10/2014 |
| CN | 204124869 U | 1/2015 |
| CN | 105565020 A | 5/2016 |
| JP | 2001080754 A | 3/2001 |

\* cited by examiner

IMAGING APPARATUS AND DOUBLE-SIDED PRINTING PAPER CONVEYING UNIT THEREOF

CROSS-REFERENCE TO RELATED APPLICATIONS

This application is a continuation application of International Application No. PCT/CN2016/108329, filed on Dec. 2, 2016, which claims priority to Chinese Patent Application No. 201511006415.0, filed on Dec. 29, 2015, all of which are incorporated herein by reference in their entirety.

TECHNICAL FIELD

The present disclosure relates to an electrophotographic imaging apparatus for forming images on a paper and, in particular, to a paper conveying member in the imaging apparatus. Specifically, the present disclosure relates to a unit in a double-sided printing imaging apparatus for conveying and aligning paper during the process of conveying paper.

BACKGROUND

Double-sided printing imaging apparatuses usually include a frame, and an imaging unit and a paper conveying mechanism mounted in the frame. The paper conveying mechanism usually includes a paper picking member, a paper conveying member, a paper discharge member, and a double-sided printing paper conveying unit. During the operation of the imaging apparatus, the paper in the paper cassette can be picked up by the paper picking member, conveyed by the paper conveying member to pass through a transfer unit and fixing unit to the paper discharge member. In cases of double-sided printing, the paper that arrives at the paper discharge member usually is conveyed in the opposite direction by the double-sided printing paper conveying unit to a transfer unit to form image on the back side of the paper.

The double-side printing paper conveying unit usually has functions of conveying and skew correction for the paper and can be detachably mounted to an imaging apparatus. In general, a mounting opening for mounting the double-side printing paper conveying unit to an imaging apparatus is disposed on a rear cover of the imaging apparatus.

As shown in FIG. 1, the double-side printing paper conveying unit often includes a guiding part 1 configured to guide the paper, a paper conveyor 2 configured to convey the paper, and an aligner 3 configured to align the sides of the paper. The aligner 3 is fixedly mounted on the guiding part 1. The paper conveyor 2 includes a driving roller and a driven roller. The driving roller is usually rotatably mounted on the guiding part 1 while the driven roller is mounted on a support 4, and the support 4 is fixedly connected to the guiding part 1. The driven roller is usually mounted on the support 4 obliquely relative to the paper conveying direction so that the driven roller can supply a conveying force for conveying the paper in the paper conveying direction and the direction perpendicular to the paper conveying direction (i.e., the alignment direction). The conveying force in the direction perpendicular to the paper conveying direction can align the sides of the paper to the aligner 3, so that the skew correction for the paper can be achieved.

The aligner 3 is fixedly mounted on the guiding part 1 in the double-sided printing paper conveying unit described above, thus alignment for paper based on the size of the paper cannot be performed as required during the double-sided printing. That is, when the paper conveying unit is used by a user to convey and align paper based on the size of the paper, there is a high probability that paper jam occurs in the imaging apparatus due to a mismatch between the size of the paper and the position of the aligner, or there is a difference between the typesetting of the image on the printed paper from a desired typesetting. Therefore, it is desired to provide a double-sided printing paper conveying unit capable of conveying and aligning paper based on the size of the paper.

SUMMARY

To solve the above technical problems, one aspect of the present disclosure provides a double-sided printing paper conveying unit, capable of conveying and aligning the paper based on a size of the paper with low failure and satisfying typesetting expectations of a user.

To solve the above technical problems, the double-sided printing paper conveying unit according to embodiments of the present disclosure may include a paper conveyor configured to convey the paper in a conveying direction, a guiding part configured to guide the paper conveyed by the paper conveyor, an aligner, and a movement mechanism. The aligner may be movably mounted on the guiding part and configured to, along an alignment direction perpendicular to the conveying direction, correct a skew posture of the paper that occurs during conveyance. The movement mechanism may be mounted on the guiding part and capable of moving the aligner along the alignment direction and between a first position corresponding to a first size of paper and a second position corresponding to a second size of paper such that the aligner can align the paper based on the size of the paper.

In conventional technologies, an aligner is fixedly mounted on the guiding part and cannot be moved, while the aligner according to embodiments of the present disclosure can be moveable mounted on the guiding part. The aligner can also be moved between the first position and second position through the movement mechanism. The first position may correspond to the first size of paper, and the second position may correspond to the second size of paper. Therefore, the double-sided printing paper conveying unit may be capable of conveying and aligning two different-sized paper with low failure and satisfying typesetting expectations of the user.

In some embodiments, the movement mechanism may be rotatably mounted on the guiding part, so that the aligner can be moved between the first position and the second position by a rotational movement of the movement mechanism.

In some embodiments, the movement mechanism may further include an elongated central rod, and a first and second cantilevers that are disposed on the central rod. The central rod can be rotatably mounted on the guiding part. The first cantilever and the second cantilevers may be extended from the central rod in the direction perpendicular to a length direction of the central rod. The aligner may include a force receiving element. When the central rod is rotated by an external force to drive the first cantilever or the second cantilever to rotate, the first cantilever or the second cantilever can act on the force receiving element, such that the movement mechanism can move the aligner between the first position and the second position.

In some optional embodiments, the double-sided printing paper conveying unit may further include a locking mechanism. The locking mechanism may be configured to lock the movement mechanism when the movement mechanism is moved to a designated position, to avoid undesired rotational movements of the mechanism movement.

Further, the locking mechanism may include a locking shaft disposed on the central rod, and a locking hole disposed on the guiding member and engaged with the locking shaft. The locking shaft and the locking hole may be parallel to the length direction of the central rod. By moving the central rod in the conveying direction of the paper, the locking shaft can be inserted into and retracted from the locking hole to achieve locking and unlocking, respectively.

In some other embodiments, the movement mechanism may further include a cam element and a restoring element. The cam element can be rotatably mounted on the guiding part, and the restoring element may be configured to provide a restoring force opposite to the force applied by the cam element. The aligner may include a force receiving element. When the cam element is rotated along a first rotation direction, the cam element can act on the force receiving element to overcome the restoring force of the restoring element, therefore, the aligner can be moved from the first position to the second position. When the cam element is rotated along a second rotation direction opposite to the first rotation direction, the aligner can be moved from the second position to the first position by the restoring element.

Another aspect of present disclosure provides an imaging apparatus. The imaging apparatus may include an imaging unit configured to form images on the paper, a driving unit configured to supply a driving force for the imaging apparatus, and a double-sided printing paper conveying unit. The double-sided printing paper conveying unit may further include a paper conveyor configured to receive the driving force from the driving unit and convey the paper in a conveying direction, a guiding part configured to guide the paper conveyed by the paper conveyor, and an aligner. The aligner may be configured to correct an skew posture of the paper that occurs during conveyance in an alignment direction perpendicular to the conveying direction. The aligner may be movably mounted on the guiding part. The double-sided printing paper conveying unit may further include a movement mechanism mounted on the guiding part and capable of moving the aligner along the alignment direction and between a first position corresponding to a first size of paper and a second position corresponding to a second size of paper such that the aligner can align the paper based on a size of the paper.

In conventional technologies, an aligner of a double-sided printing paper conveying unit in a double-sided printing imaging apparatus is fixedly mounted on the guiding part and cannot be moved. Whereas, in the imaging apparatus according to embodiments of the present disclosure, the aligner of the double-sided printing paper conveying unit can be moveably mounted on the guiding part. The aligner can also be moved between the first position and second position through the movement mechanism. The first position may correspond to one size of paper, and the second position may correspond to a different size of paper. Therefore, the imaging apparatus of the present disclosure is capable of conveying and aligning two different-sized paper with low failure and satisfying typesetting expectations of the user.

DETAILED DESCRIPTION

Structures and beneficial effects of a double-sided printing paper conveying unit and an imaging apparatus according to the present disclosure are described below in detail with reference to the accompanying drawings.

Figure 1:
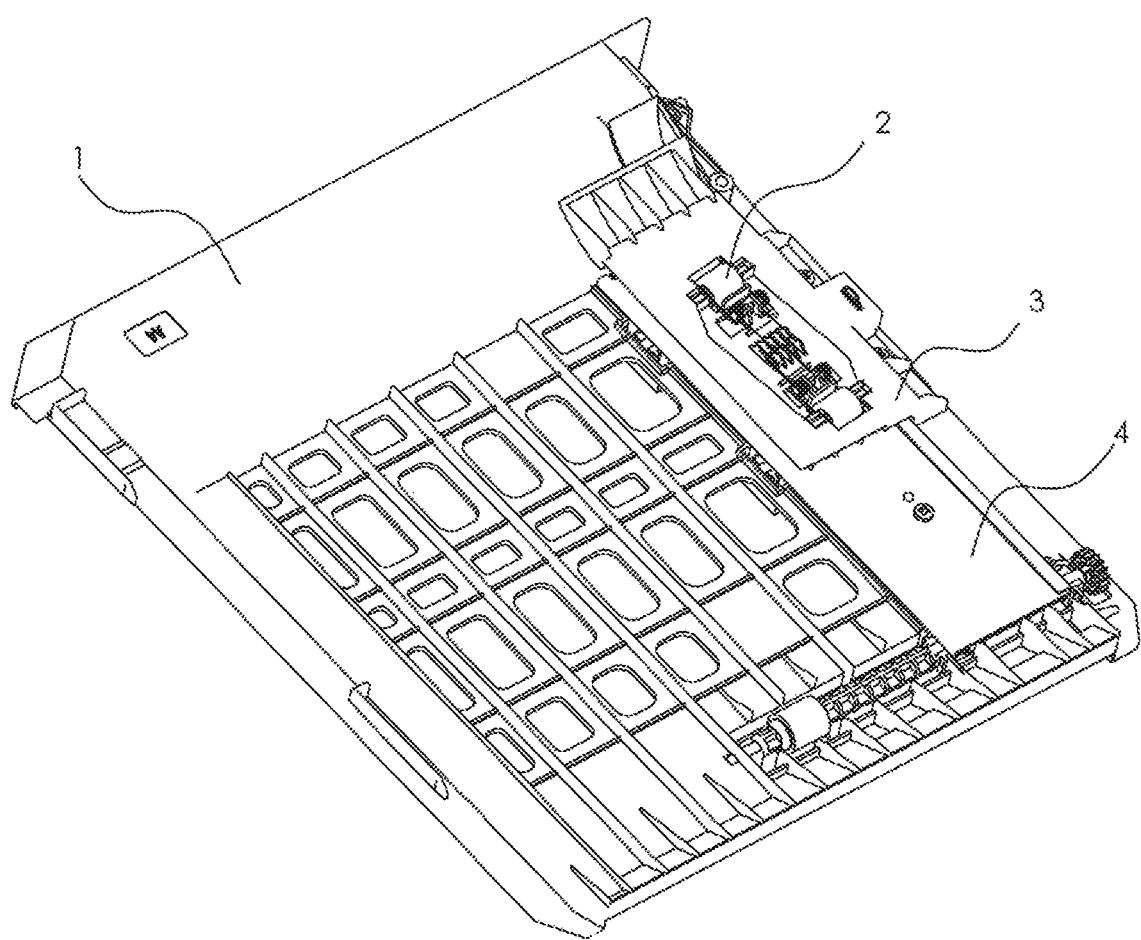
FIG. 1 shows a perspective view of a conventional double-sided printing paper conveying unit.
Figure 2:
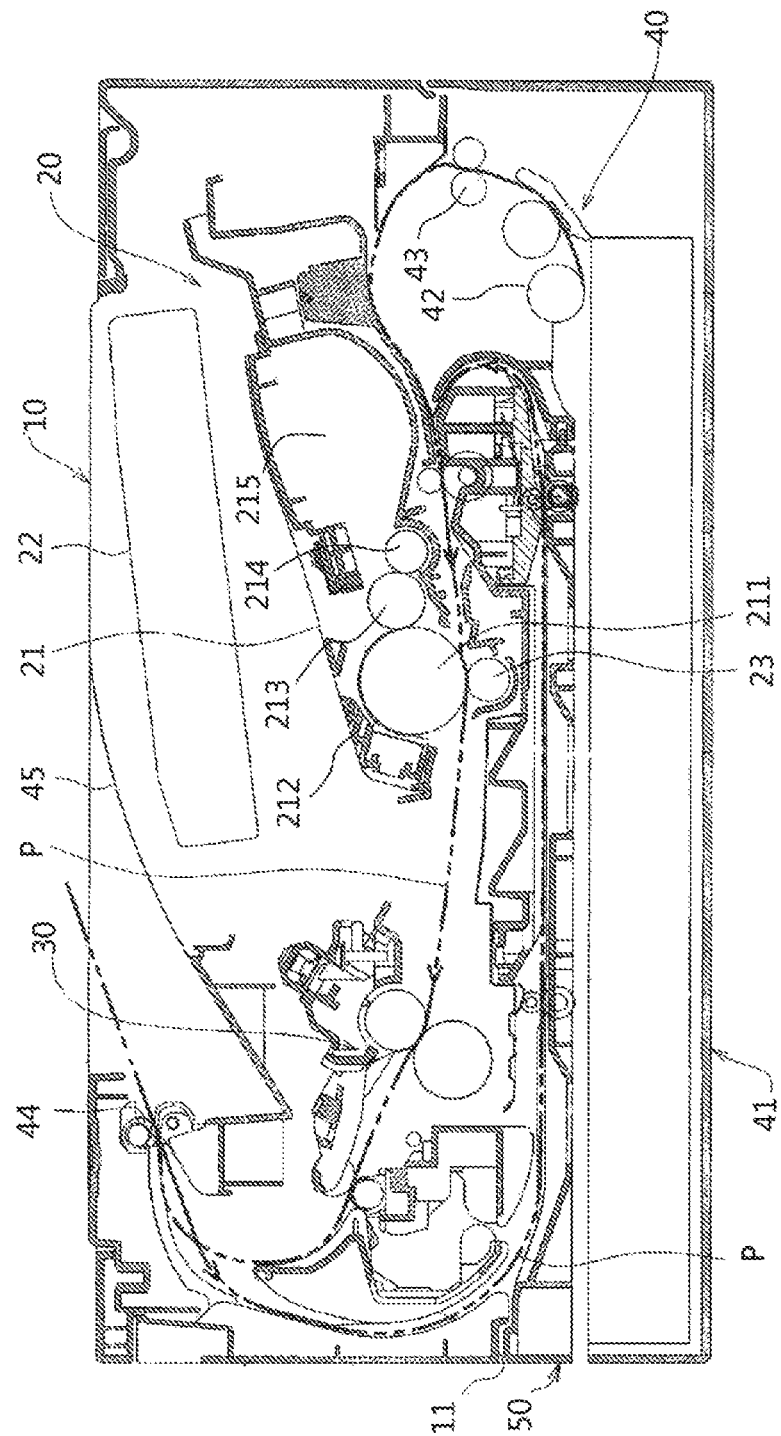
FIG. 2 shows a sectional view of an overall structure of an imaging apparatus according to embodiments of the present disclosure.

FIG. 2 shows a section view of an overall structure of an imaging apparatus according to embodiments of the present disclosure. The imaging apparatus 10 according to embodiments of the present disclosure may include an imaging unit 20, a fixing unit 30, and a paper conveying system 40. The imaging unit 20 may be configured to form toner images on a piece of paper P. The fixing unit 30 may be configured to fix the toner images on the paper P. The paper conveying system 40 may be configured to pick up, convey and discharge the paper P. The imaging unit 20 may further include a toner cartridge 21, a exposure member 22 and a transferring member 23. The exposure member 22 may be configured to form electrostatic latent images on a photosensitive element 211 of the toner cartridge 21 by light irradiation on the photosensitive element 211. The transferring member may be configured to transfer the toner that is electrostatically adsorbed in the area of the electrostatic latent images to the paper P. The toner images transferred on the paper P can be fixed on the paper P by the fixing unit 30 under a high-temperature and high-pressure treatment.

The toner cartridge may include the photosensitive element 211, a frame 212, a developing roller 213 and a toner-feeding roller 214. The photosensitive element 211, the developing roller 213, and the toner-feeding roller 214 can be rotatably mounted on the frame 212. The inner volume of the frame 212 may include a container 215, configured to accommodate the toner, and the toner in the container 215 can be provided to the developing roller 213 by the toner-feeding roller 214. Through a toner-layer doctor blade (not shown), a uniform toner layer can be formed on the developing roller 213. The toner layer can be transferred to the electrostatic latent image area on the photosensitive element 211 by an electronic field, and the toner in the electrostatic latent image area can be transferred onto the paper P by the transferring member 23.

Along the conveying path of the paper P, the paper conveying system 40 may successively include a paper cassette 41, configured to store paper P; a picking member 42, configured to, from the paper cassette 41, pick up paper P stacked in the paper cassette 41; an intermediate conveyor 43, configured to convey the paper; a paper discharge member 44; and a paper discharge tray 45. The paper discharge member 44 is configured to discharge the paper P to the paper discharge tray after printing is completed, and the paper P can be stacked on the paper discharge tray 45.

During the operation of the imaging apparatus 10, the paper P in the paper cassette 41 can be picked up by the picking member 42 and conveyed to a transfer position through the intermediate conveyor 43, and the electrostatic latent toner image is formed on the photosensitive element 211 by the exposure member 22 and the developing roller 213. When the paper P passes the transfer position, the electrostatic latent toner images on the photosensitive element 211 can be transferred to the paper P by the transferring member 23. The toner images adsorbed on the paper P can be fixed onto the paper P by the fixing unit 30 under the high-temperature and high-pressure treatment, and then the paper P is conveyed to the paper discharge member 44. In this way, a single printing process is completed. In the case of single-sided printing, the paper P is discharged onto the paper discharge tray 45 via the paper discharge member 44. In the case of double-sided printing, via reverse rotation of the paper discharging member 44, the paper P can be fed into the imaging apparatus 10 again to perform printing on the back side.

As shown in FIG. 2, the paper P on which the image is printed on the front side is conveyed to the double-sided printing paper conveying unit 50 by the reverse rotation of the paper discharge member 44. The structure and working principle of the double-sided paper conveying unit 50 is described below in detail. The paper P can be conveyed to the transfer position by the double-sided paper conveying unit 50. The transferring member 23 can transfer the toner image to the reverse side of the paper P. After the image is fixed by the fixing unit 30, the paper P can be conveyed to the paper discharge member 44 and discharged to the paper discharge tray 45 by the paper discharge member 44. Through the above procedure, the process of double-sided printing on the paper by the imaging apparatus is completed.

Figure 3:
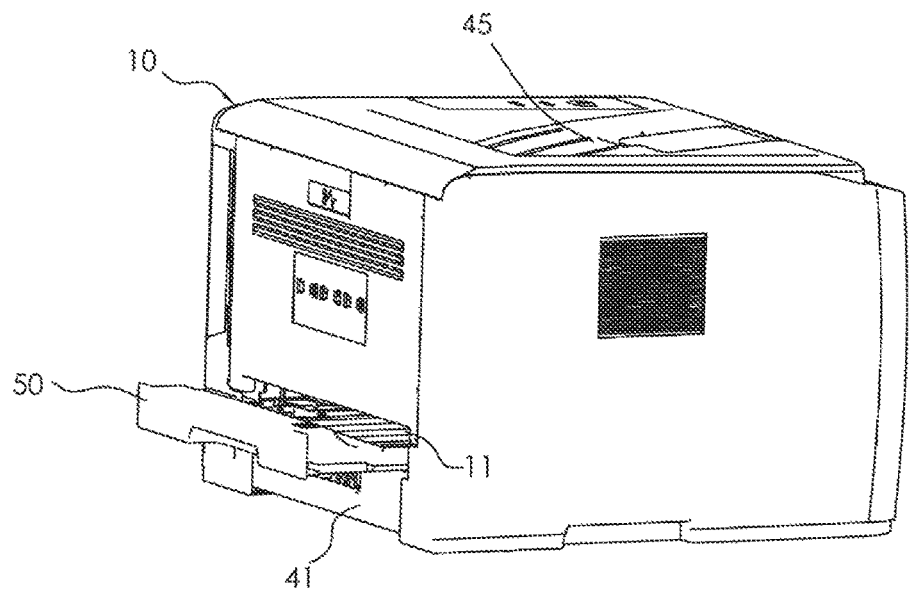
FIG. 3 shows a schematic view of an assembly relationship between an imaging apparatus and a double-side printing paper conveying unit according to embodiments of the present disclosure.

FIG. 3 shows a schematic view of an assembly relationship between the imaging apparatus 10 and the double-side printing paper conveying unit 50 according to embodiments of the present disclosure. As shown in FIG. 3, an opening 11, configured to enable the double-sided printing paper conveying unit 50 to be inserted into or removed from the imaging apparatus 10, may be disposed on a housing of the imaging apparatus, e.g. the rear side wall of the housing. A guide rail (not shown), configured to guide and support the double-sided printing paper conveying unit 50 may also be disposed in the opening 11. After mounted to a designated position, the double-sided printing paper conveying unit 50 may be located between the paper cassette 41 and the imaging unit 20 along the vertical direction.

Figure 4:
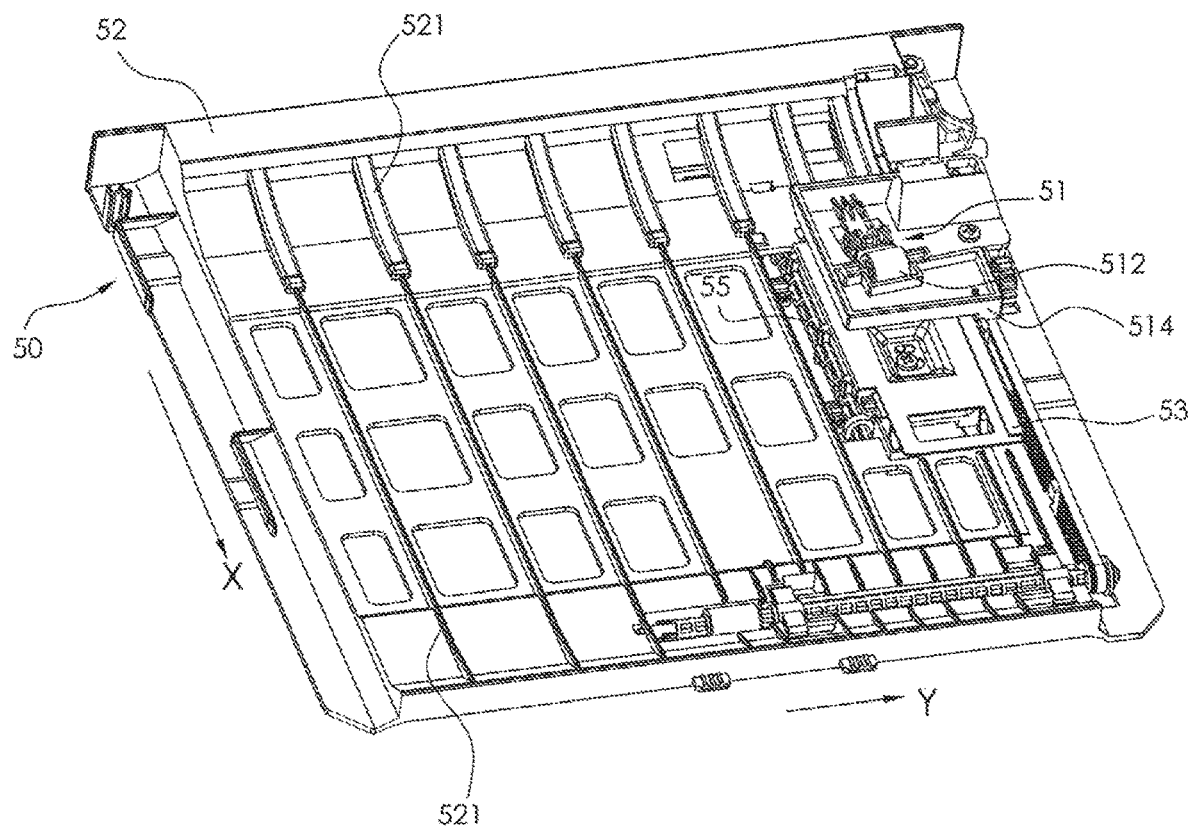
FIG. 4 shows a perspective view of a double-sided printing paper conveying unit according to an exemplary embodiment of the present disclosure.

FIG. 4 to FIG. 10 show a double-side printing paper conveying unit 50 according to an exemplary embodiment of the present disclosure. As shown in FIG. 4, the double-side printing paper conveying unit 50 may include a paper conveyor 51 configured to provide a forward driving force for the paper P, a guiding part 52 configured to guide the paper P to move forward along a designated path, and an aligner 53 configured to correct a skew posture of the paper P occurring during the forward movement. The paper conveyor 51 and the aligner 53 may be mounted on the guiding part 52.

Figure 5:
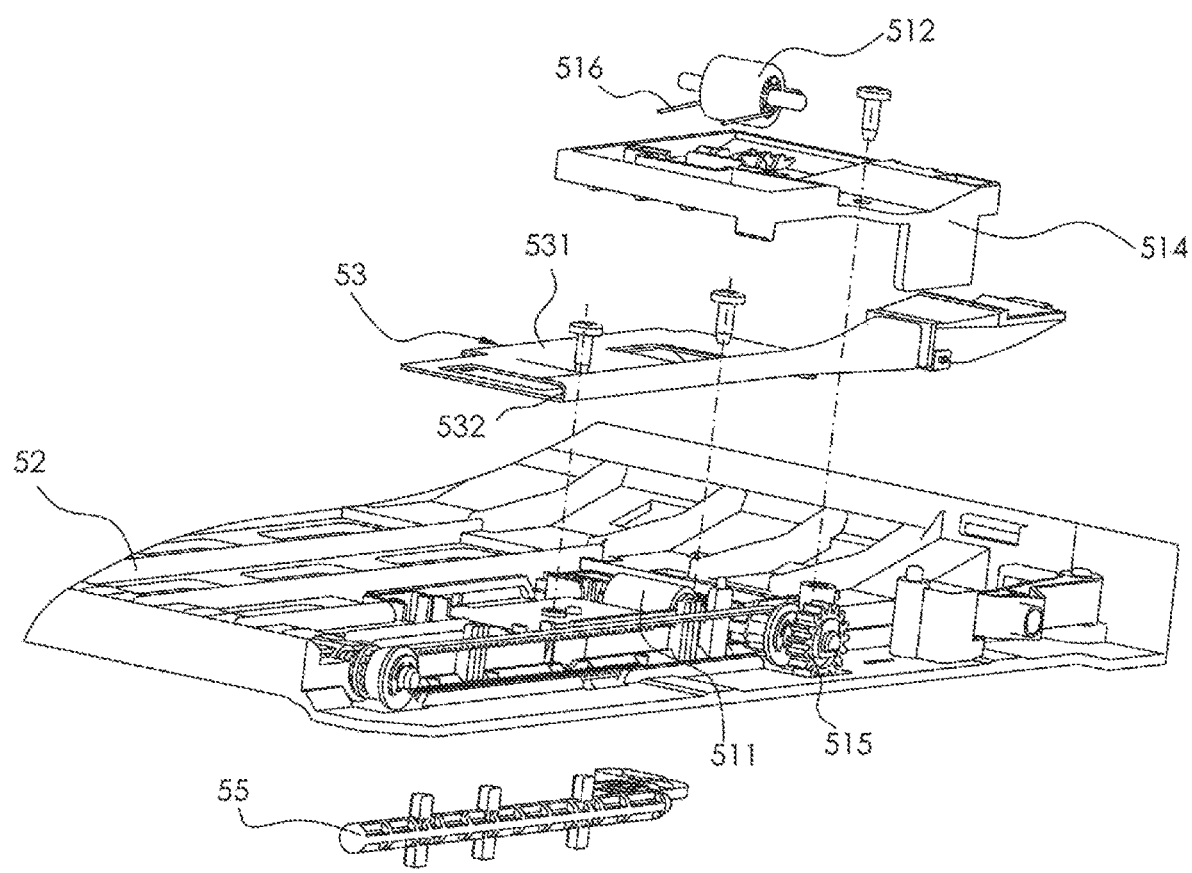
FIG. 5 shows an exploded view of the double-sided printing paper conveying unit shown in FIG. 4.

As shown in FIG. 5, in some embodiments, the guiding part 52 may further be constructed by flat plates, and the paper P can be moved along a path defined by the upper surface of the guiding part 52 during the conveyance. In some embodiments of the present disclosure, to reduce the friction force of the paper P on the upper surface of the guiding part 52 during the conveyance, usually a guiding part rib 521 is disposed on the upper surface of the guiding part 52. The paper conveyor 51 may be composed by a driving roller 511 and a driven roller 512. The driving roller 511 may be connected to an end gear 515 through a shaft to receive the driving force from a driving unit (not shown) in the imaging apparatus 10. The driving roller 511 can be rotatably mounted on the guiding part 52. In addition, the driven roller 512 may be rotatably mounted on a support 514, and the support 514 can be fixedly mounted to the guiding part 52 via a fastener. In some optional embodiments, an elastic member 516 may be disposed between the driven roller 512 and the support 514. The elastic member 516 may be, for example, a torsion spring. The elastic member 516 may be configured to provide a constant contact pressure between the driving roller 511 and the driven roller 512 to ensure that a constant force can be provided to convey the paper P.

In order to perform skew correction for the paper P during the conveyance, the force provided by the paper conveyor 51 for conveying the paper P can be decomposed into a component force in a conveying direction X of the paper P and a component force in an alignment direction Y perpendicular to the conveying direction X. In order to achieve the skew correction, the driven roller 512 may be mounted on the support 514 with an inclination angle. The inclination angle is configured to enable the paper P to be moved toward the aligner 53 conveyed by the paper conveyor 51 and aligned by the aligner 53 along the alignment direction Y. The above process is described below in detail.

Figure 6:
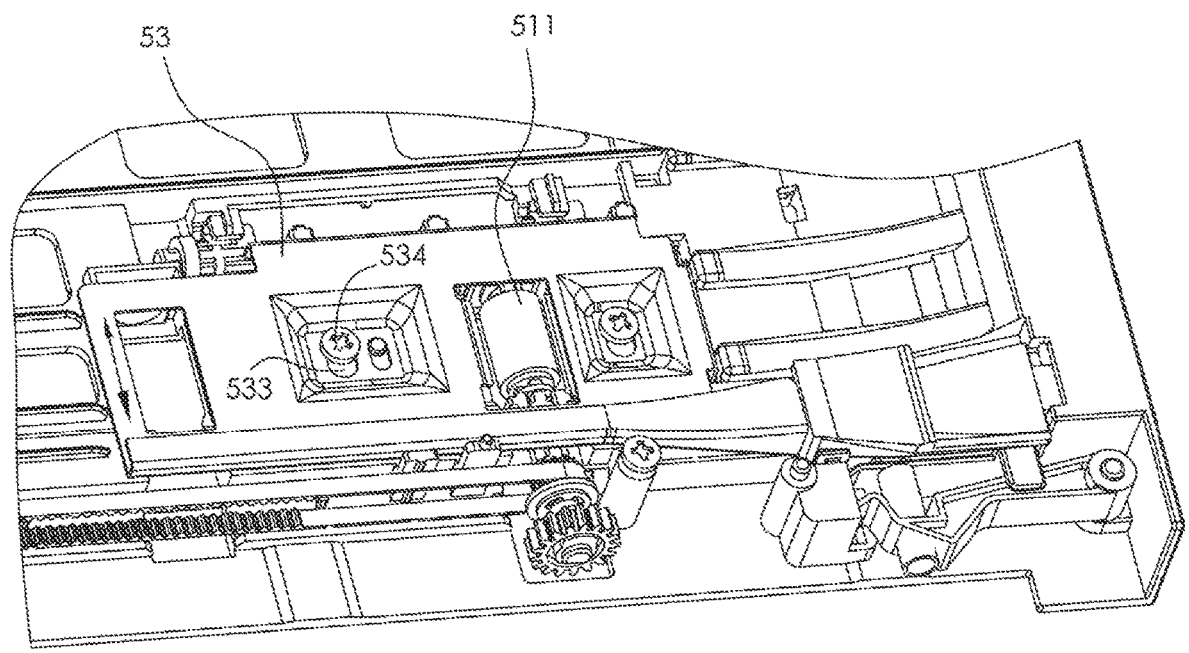
FIG. 6 shows a partial perspective view of the double-sided printing paper conveying unit of FIG. 4 with a support for a driven roller removed.
Figure 7:
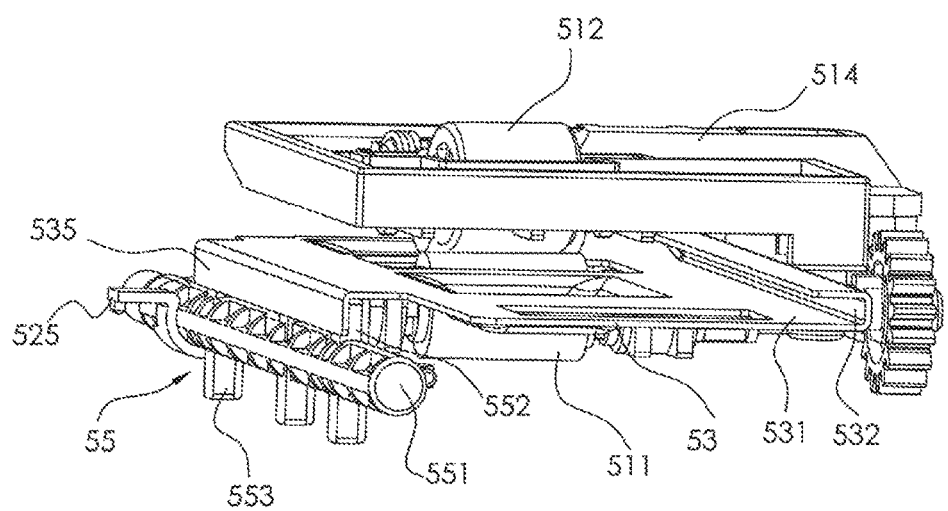
FIG. 7 shows a perspective view of the double-sided printing paper conveying unit shown in FIG. 4 with a guiding part removed.

As shown in FIG. 6 and FIG. 7, the aligner 53 can be movably mounted on the guiding part 52. The aligner 53 may include a guiding surface 531 configured to guide the paper P, and a aligning surface 532 configured to align the sides of the paper P. The guiding surface 531 is parallel to the upper surface of the guiding part 52, while the aligning surface 532 is perpendicular to the guiding surface 531. The aligner 53 may include an elongated through hole 533. The aligner 53 can be mounted to the guiding part 52 by a fastener 534 passing through the elongated through hole 533. When the aligner 53 is moved, the fastener 534 can also be moved in the elongated through hole 533. The aligner 53 may be disposed between the driving roller 511 and the driven roller 512. Further, the aligning surface 522 of the aligner 53 may be disposed at or slightly below a contacting point (NIP point) of the driving roller 511 and the driven roller 512. When the paper P is conveyed, the paper P can be simultaneously moved by the paper conveyor 51 in the two directions of the conveying direction X and the alignment direction Y, and sides of the paper P may abut against the aligning surface 532 of the aligner 53. In this way, it is possible to prevent the paper P from skewing during conveyance, or to align the paper P that is skewed before reaching the double-sided printing paper conveying unit 50.

Figure 8:
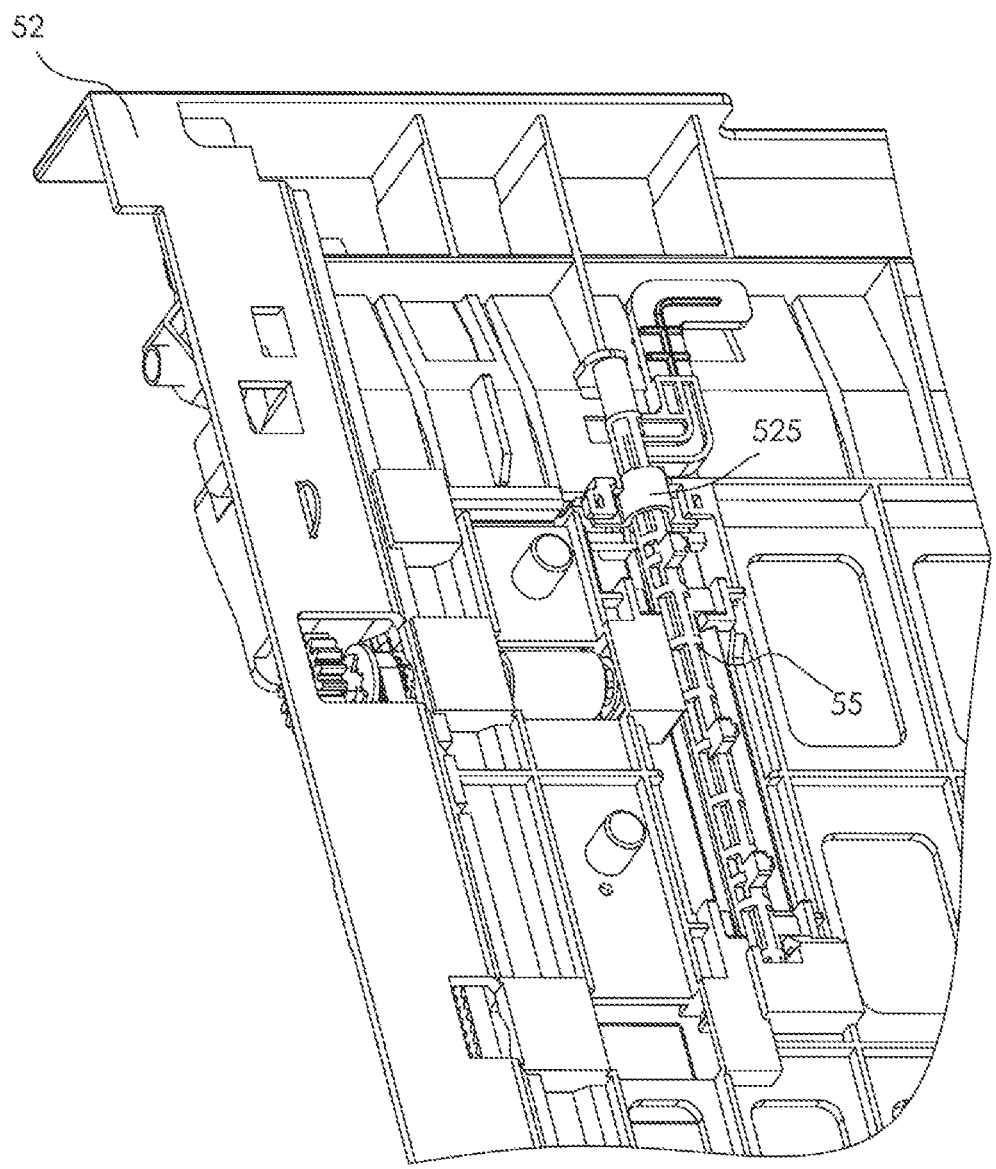
FIG. 8 shows a partial view of another side of the double-sided printing paper conveying unit shown in FIG. 4.
Figure 9:
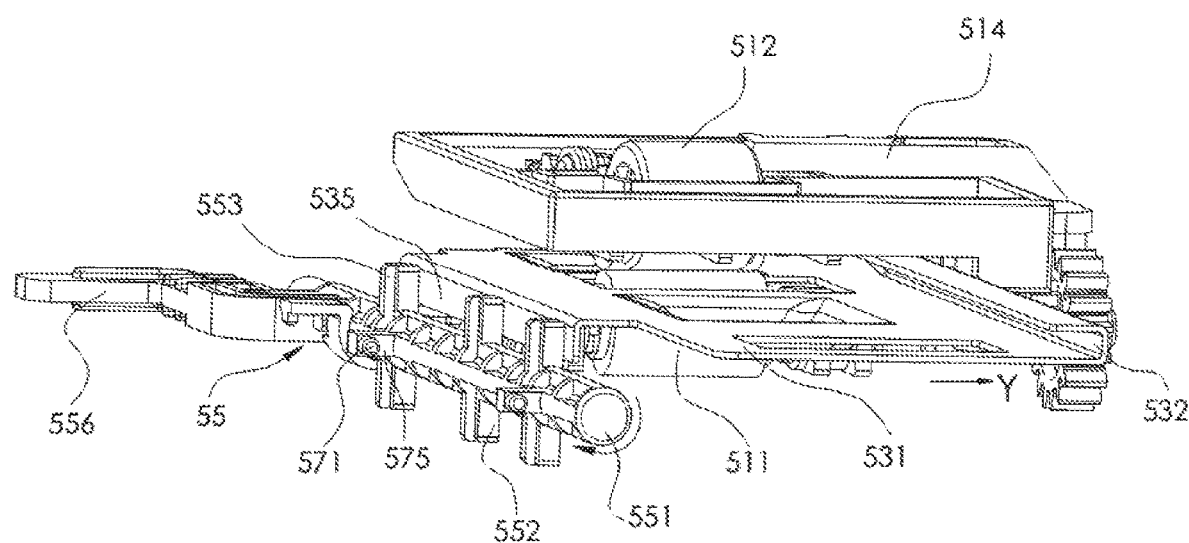
FIG. 9 shows a schematic view of an operating principle of a movement mechanism of the double-sided printing paper conveying unit shown in FIG. 7.

As shown in FIG. 7 to FIG. 9, the double-sided printing paper conveying unit 50 according to embodiments of the present disclosure may further include a movement mechanism 55 mounted on the guiding part 52. The movement mechanism can move the aligner 53 between the first position and the second position along the alignment direction Y, so that the aligner 53 can align paper P based on the size of the paper P. The first position may correspond to, for example, alignment for A4-type paper, while the second position may correspond, for example, alignment for letter-type paper.

In the first exemplary embodiment, the movement mechanism 55 may be rotatably mounted on the guiding part 52 and include an elongated central rod 551. A first cantilever 552 and a second cantilever 553 are disposed on the central rod 551. The central rod 551 may be rotatably mounted on the guiding part 52 through a bearing 525 disposed on the guiding part 52. In this exemplary embodiment, the central rod 551 may be disposed at the side of the guiding part 52 opposite to the mounting side of the aligner 53 so that there is enough room for a user to rotate the movement mechanism 55 during operation. The first cantilever 552 and the second cantilever 553 may extend from the central rod 551 in a direction perpendicular to the length of the central rod 551. Optionally, the first cantilever 552 and the second cantilever 553 may extend in opposite directions relative to the central rod 551. To facilitate the rotation of the movement mechanism 55, a rotation handle 556 may be disposed at the one end of the central rod 551, and the rotation handle 556 and the central rod 551 may be integrally formed.

Correspondingly, the aligner 53 may include a force receiving element 535 configured to receive the force applied by the movement mechanism 55 on the aligner 53. In some embodiment, the force receiving element 535 may be located on the side of the aligner 53 opposite to the side where the aligning surface 532 is located. A force receiving surface of the force receiving element 535 may be perpendicular to the guiding surface 531 of the aligner 53.

When the user needs to move the aligner 53, for example, from the first position as shown in FIG. 7, the user may take out the double-sided printing paper conveying unit 50 from the imaging apparatus 10 and rotate the rotation handle 556 in the rotation direction as shown in FIG. 9 to rotate the movement mechanism 55 until the second cantilever 553 of the movement mechanism 55 is in contact with the force receiving element 535. The second cantilever 553 can act on the force receiving element 535 when the movement mechanism 55 is further rotated, causing the aligner 53 to be transitionally moved by the rotational force of the movement mechanism 55 along the alignment direction Y, which is marked by an arrow in FIG. 9, until the aligner 53 is moved to the second position. In this way, the aligner 53 can be moved by the movement mechanism 55 to achieve conveyance and alignment for two different-sized paper.

Correspondingly, it is also possible to reversely rotate the movement mechanism 55 by reverse the movement described above until the first cantilever 552 of the movement mechanism 55 is in contact with the force receiving element 535 of the aligner 53. The first cantilever 552 can act on the force receiving element 535 of the aligner 53 when the movement mechanism 55 is continuously moved, causing the aligner 53 can be transitionally moved by the rotational force of the movement mechanism 55, so that the aligner 53 can be moved from the second position to the first position.

Figure 10:
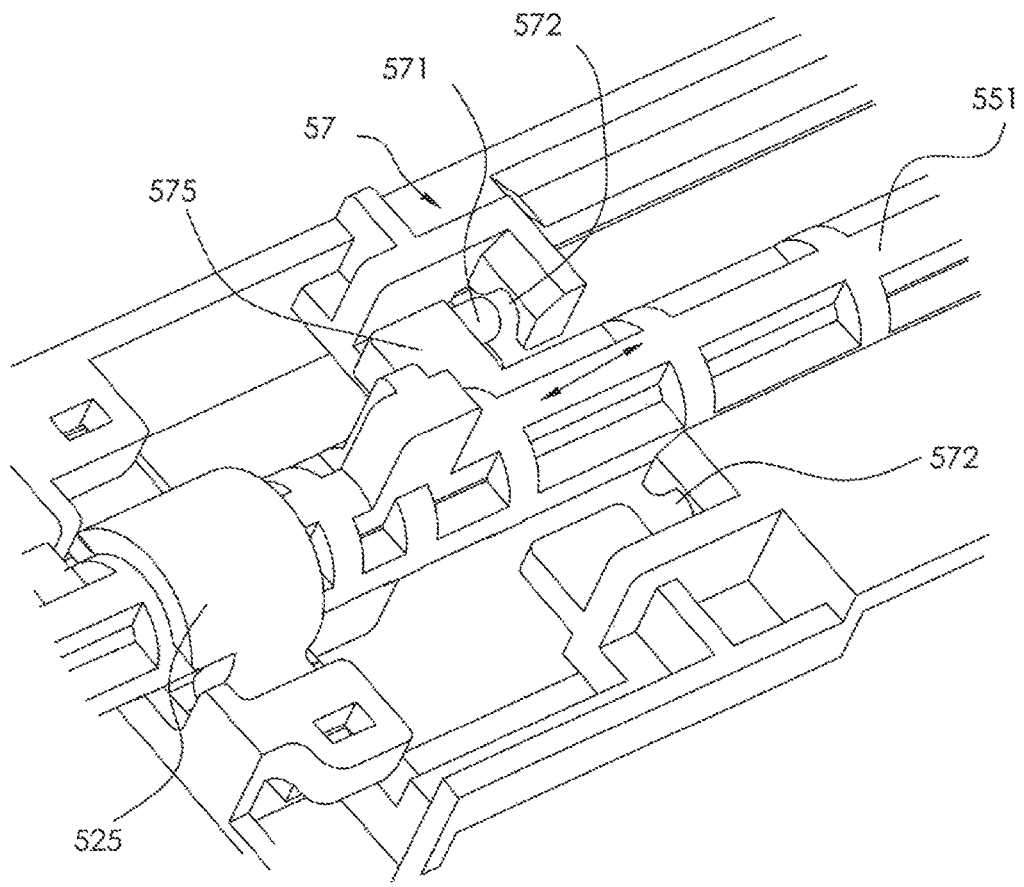
FIG. 10 shows a partial view of a locking mechanism of the double-sided printing paper conveying unit shown in FIG. 4.

FIG. 10 shows the double-sided printing paper conveying unit 50 according to one optional embodiment of the present disclosure. In this embodiment, the double-sided printing paper conveying unit 50 according to the present disclosure may further include a locking mechanism 57, configured to lock the movement mechanism 55 when the movement mechanism 55 is rotated to a designated position to avoid undesired rotational movement of the movement mechanism 55.

In some embodiments, the locking mechanism 57 may include a locking shaft 571 disposed on the central rod 551 and a locking hole 572 disposed on the guiding part 52. A protrusion 575 may extend from the central rod 551, and the locking shaft 571 may be disposed on the protrusion 575 and parallel to the length direction of the central rod 551. Correspondingly, the locking hole 572 may also extend along a direction parallel to the length direction of the central rod 551. Before the central rod 551 is rotated, the locking shaft 571 can be retracted from the locking hole 572 by moving the central rod 551 along conveyance direction X of the paper to achieve unlocking of the movement mechanism 55, and then central rod 551 is rotated. When the central rod 551 is rotated to the designated position, the central rod 551 can be moved in the opposite direction, and the locking shaft 571 can be inserted into the locking hole 572 to lock the movement mechanism 55. By the above manner, the undesired rotational movement of the movement mechanism 55 can be avoided during the operation of the double-sided printing paper conveying unit 50.

Figure 11:
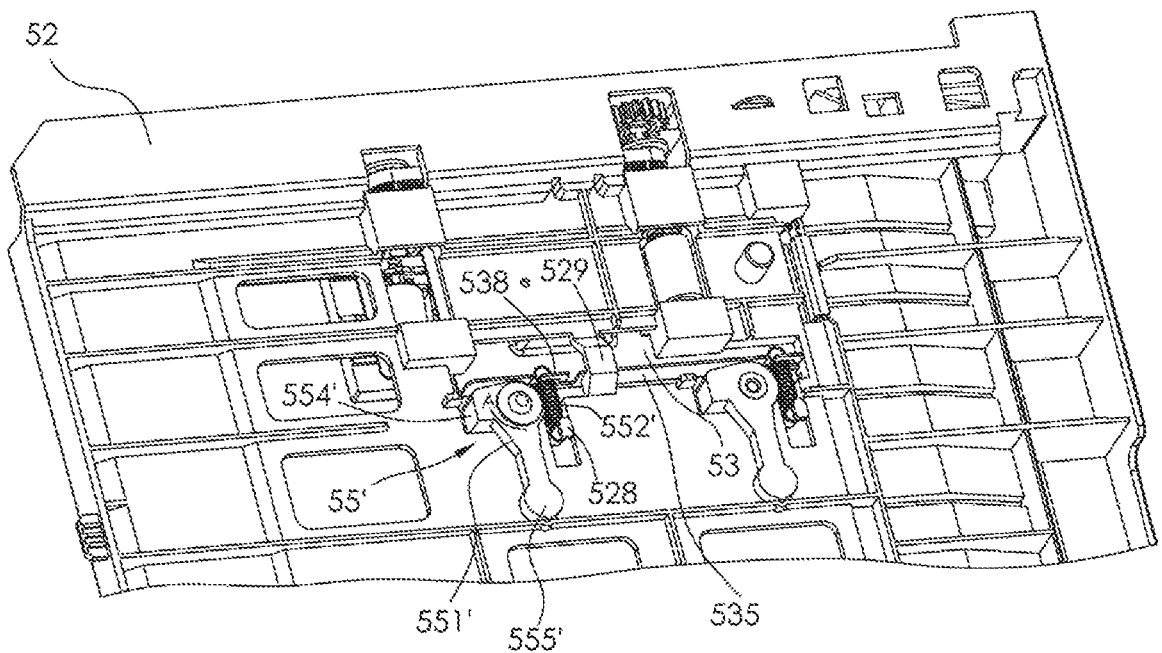
FIG. 11 shows a partial perspective view of a double-sided printing paper conveying unit according to another exemplary embodiment of the present disclosure.
Figure 12:
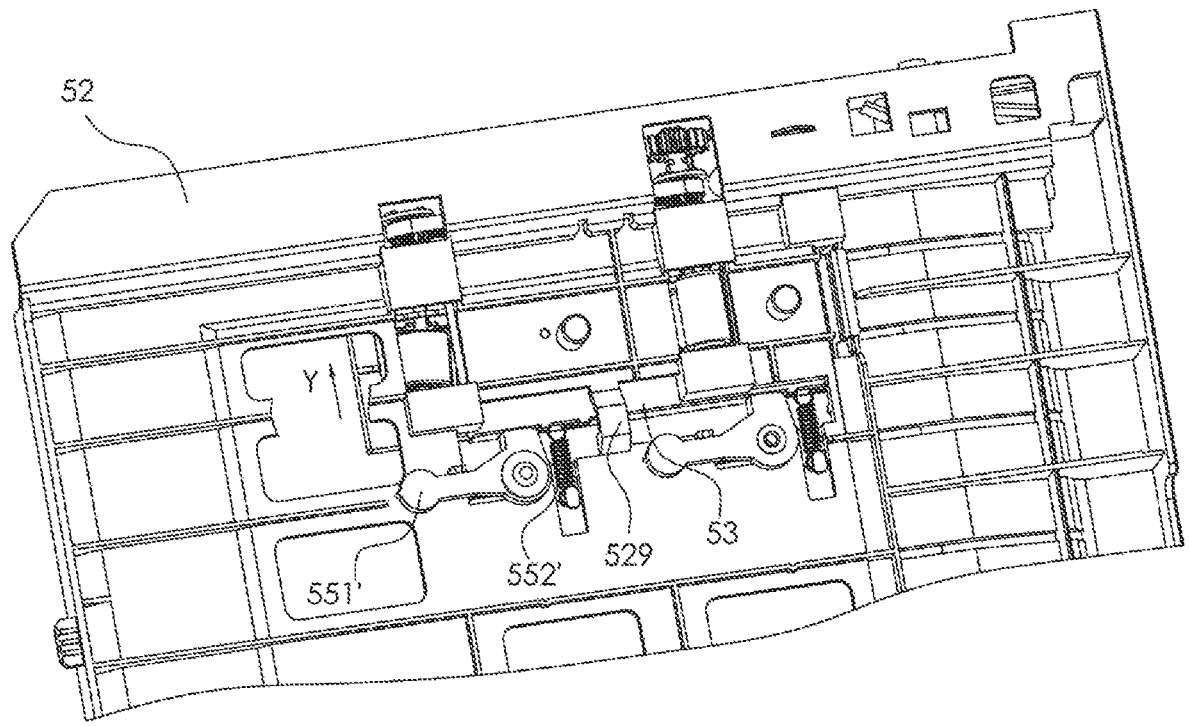
FIG. 12 shows a schematic diagram of an operating principle of a movement mechanism of the double-sided printing paper conveying unit shown in FIG. 11.

FIG. 11 and FIG. 12 illustrate a double-side printing paper conveying unit 50 according to second exemplary embodiment of the present disclosure. Hereinafter, with respect to descriptions of the second exemplary embodiment, contents about structure and operation principle that are the same as those of the first exemplary embodiment are not elaborated, and the same structures are denoted by the same reference numerals according to the first exemplary embodiment. The differences between the second exemplary embodiment and the first exemplary embodiment are about the structure and the operating principle of the movement mechanism. The second exemplary embodiment is described below in detail.

As shown in FIG. 11, in the second exemplary embodiment, the movement mechanism 55' of the double-sided printing paper conveying unit 50 may include a cam element 551' and a restoring element 552'. The cam element 551' can be rotatably mounted on the guiding part 52. The cam element 551' can be mounted a side of the guiding part 52 opposite to the side where the aligner 53 is located. The restoring element 552' may be able to provide a restoring force opposite to the force applied by the cam element 551'. The restoring element 552' may be a tension spring. In this exemplary embodiment, the restoring element 552' may be a compressed elastic spring or other similar elastic element.

In some embodiments, the cam element 551' may further include a cam 554' and a handle 555', and the cam 554' may be integrally formed with the handle 555'. When the cam element 551' is rotated by the handle 555', the cam 554' during rotation may act on the force receiving element 535 of the aligner 53, so that the aligner 53 can be moved in the alignment direction Y. In some embodiments, contact portion between the cam 554' and the force receiving portion 535 may be a flat surface. The structure of the flat surface can facilitate to position the final state of the cam, so that the cam can be prevented from rotating under the reverse force of the restoring element 552'. In addition, one end of the extension spring 552' may be connected to the mounting part 538 on the aligner 53, and the other end may be connected to the mounting part 528 of the guiding part 52. Therefore, an elastic restoring force can be provided between the aligner 53 and the guiding part 52, and the aligner 53 can be moved in a direction opposite the alignment direction Y by the elastic restoring force.

When the cam element 551' is rotated in the first rotation direction A, the cam 554' of the cam element 551' may act on the force receiving element 535 of the aligner 53 and overcome the restoring force of the tension spring 552', so that the aligner 53 can be moved from the first position to the second position. Conversely, when the cam element 551' is rotated in the second rotation direction opposite to the first rotation direction A, the cam 554' of the cam element 551' may be moved away from the force receiving element 535 of the aligner 53, and the aligner 53 can be moved from the second position to the first position by the restoring force of the tension spring 552'. When the aligner 53 is moved to the first position, the force receiving element 535 of the aligner 53 may be in contact with the stopper 529 disposed on the guiding part 52, so that the aligner 53 can be returned to the designated position as desired. In this way, the movement of the aligner 53 between the first position and the second position can be achieved, so that the aligner 53 can align two different-sized paper.

In the operation process of the imaging apparatus 10, when the paper for printing needs to be switched, it may be only necessary to take out the double-sided printing paper conveying unit 50 from the opening 11 on the rear wall of the imaging apparatus 10, move the aligner 53 through a movement member 55 or 55', and remount the double-sided printer paper conveying unit 50 into the imaging apparatus 10 through the opening 11. At this time, the imaging apparatus 10 can print on both sides of the paper of another size with low failure and satisfying typesetting expectations of the user.

It is intended that the specification and embodiments be considered as examples only and not to limit the scope of the disclosure. Any modification and equivalently replacement for the technical solution of the present disclosure should all fall in the spirit and scope of the technical solution of the present disclosure. The protection scope and concept of the present disclosure are specifically defined by the claims.

What is claimed is:

1. A double-sided printing paper conveying unit, comprising:
    a paper conveyor, configured to convey paper in a conveying direction;
    a guiding part, configured to guide the paper conveyed by the paper conveyor;
    an aligner movably mounted on the guiding part, and configured to correct a skew posture of the paper during conveyance in an alignment direction perpendicular to the conveying direction; and
        a movement mechanism mounted on the guiding part and capable of moving the aligner along the alignment direction and between a first position corresponding to a first size of paper and a second position corresponding to a second size of paper such that the aligner is able to align the paper based on a size of the paper, wherein the movement mechanism is rotatably mounted on the guiding part so that the movement mechanism is able to be moved between the first position and the second position by a rotational movement of the movement mechanism, wherein:
        the movement mechanism comprises a cam element rotatably mounted on the guiding part, and a restoring element configured to provide a restoring force opposite to the force applied by the cam element;
        the aligner further comprises a force receiving element; and
        the cam element comprises a handle and a cam integrally formed with the handle.

2. The double-sided printing paper conveying unit according to claim 1, wherein:
    the movement mechanism includes an elongate central rod rotatably mounted on the guiding part, and a first cantilever and a second cantilever disposed on the central rod and able to be extended from the central rod in the direction perpendicular to a length direction of the central rod; and
    the aligner includes a force receiving element and, when the central rod is rotated by an external force to drive the first cantilever or the second cantilever to rotate, the first cantilever or the second cantilever is capable of acting on the force receiving element, such that the movement mechanism is able to move the aligner between the first position and the second position.

3. The double-sided printing paper conveying unit according to claim 2, further comprising:
    a locking mechanism, configured to lock the movement mechanism when the movement mechanism is moved to a designated position, so as to avoid undesired rotational movements of the movement mechanism.

4. The double-sided printing paper conveying unit according to claim 3, wherein:
    the locking mechanism comprises a locking shaft disposed on the central rod, and a locking hole disposed on the guiding member and engaged with the locking shaft; and the locking shaft and the locking hole are parallel to the length direction of the central rod; and
    the locking shaft is able to be inserted into and withdrawn from the locking hole to achieve locking and unlocking, respectively, by moving the central rod in the conveying direction of the paper.

5. The double-sided printing paper conveying unit according to claim 1, wherein the restoring element is a tension spring, and one end of the tension spring is connected to the aligner and the other end is connected to the guiding part, so as to provide the restoring force between the aligner and the guiding part.

6. The double-sided printing paper conveying unit according to claim 1, wherein the paper conveyor comprises a driving roller and a driven roller, the driving roller and the driven roller are respectively located on two sides of the aligner, the driving roller is mounted on the guiding part, the driven roller is mounted on a support of the driven roller, and the support of the driven roller is detachably mounted on the guiding part.

7. The double-sided printing paper conveying unit according to claim 1, wherein the paper conveyor comprises a driving roller and a driven roller, the driving roller and the driven roller are respectively located on two sides of the aligner, the driving roller is mounted on the guiding part, the driven roller is mounted on a support of the driven roller, and the support of the driven roller is detachably mounted on the guiding part.

8. An imaging apparatus, comprising:
    an imaging unit, configured to form images on paper;
    a driving unit, configured to provide a driving force for the imaging unit; and
    a double-sided printing paper conveying unit, detachably mounted on the image apparatus, comprising:

a paper conveyor, configured to receive the driving force from the driving unit and convey the paper along a conveying direction;

a guiding part, configured to guide the paper conveyed by the paper conveyor;

an aligner movably mounted on the guiding part and configured to correct a skew posture of the paper during conveyance in an alignment direction perpendicular to the conveying direction, wherein the aligner includes a guiding surface configured to guide the paper and an aligning surface configured to align a side of the paper, and the guiding surface is parallel to an upper surface of the guiding part and the aligning surface is perpendicular to the guiding surface; and a movement mechanism mounted on the guiding part, capable of moving the aligner along the alignment direction and between a first position corresponding to a first size of paper and a second position corresponding to a second size of paper such that the aligner is able to align the paper based on a size of the paper, wherein:

the movement mechanism is rotatably mounted on the guiding part so that the movement mechanism is able to be moved between the first position and the second position by a rotational movement of the movement mechanism;

the movement mechanism comprises a cam element rotatably mounted on the guiding part, and a restoring element configured to provide a restoring force opposite to the force applied by the cam element;

the aligner further comprises a force receiving element;

the cam element comprises a handle and a cam integrally formed with the handle; and the double-sided printing paper conveying unit can be inserted into or removed from an image apparatus in the conveying direction.

9. The imaging apparatus according to claim 8, wherein, the movement mechanism includes an elongate central rod rotatably mounted on the guiding part, and a first cantilever and a second cantilever disposed on the central rod and able to be extended from the central rod in the direction perpendicular to a length direction of the central rod; and the aligner includes a force receiving element and, when the central rod is rotated by an external force to drive the first cantilever or the second cantilever to rotate, the first cantilever or the second cantilever is capable of acting on the force receiving element, such that the movement mechanism is able to move the aligner between the first position and the second position.

10. The imaging apparatus according to claim 9, wherein the double-sided printing paper conveying unit further comprises:

a locking mechanism, configured to lock the movement mechanism when the movement mechanism is moved to a designated position, so as to avoid undesired rotational movements of the movement mechanism.

11. The imaging apparatus according to claim 10, wherein:

the locking mechanism comprises a locking shaft disposed on the central rod, and a locking hole disposed on the guiding member and engaged with the locking shaft; and the locking shaft and the locking hole are parallel to the length direction of the central rod; and the locking shaft is able to be inserted into and withdrawn from the locking hole to achieve locking and unlocking, respectively, by moving the central rod in the conveying direction of the paper.

12. The imaging apparatus according to claim 8, wherein:

when the cam element is rotated along a first rotation direction, the cam element acts on the force receiving element to overcome the restoring force of the restoring element, therefore, the aligner is able to be moved from the first position to the second position; and when the cam element is rotated along a second rotation direction opposite to the first direction, the aligner is able to be moved from the second position to the first position by the restoring element.

* * * * *